United States Patent Office 3,092,550
Patented June 4, 1963

3,092,550
ANTIBIOTIC DANUBOMYCIN AND PROCESS FOR ITS MANUFACTURE
Ernst Gaeumann, Zurich, and Walter Voser, Binningen, Switzerland, assignors to Ciba Corporation, a corporation of Delaware
No Drawing. Filed Oct. 1, 1958, Ser. No. 764,501
Claims priority, application Switzerland Oct. 29, 1957
17 Claims. (Cl. 167—65)

This invention provides a new antibiotic, referred to below as danubomycin, its components B1, B2, B3 and B4 and salts and mixtures thereof, and also pharmaceutical preparations containing these compounds and a process for the manufacture of these substances and substance mixtures.

The antibiotic danubomycin is produced in the culture of a strain of the species *Streptomyces griseus* which was isolated by known methods from a sample of earth collected at Donaueschingen (Germany). It is preserved in our laboratories and in the Federal Institute of Technology, Institute for special Botany, Zurich, under the reference A–9990. A sample of the micro-organism has also been deposited with the United States Department of Agriculture, Agricultural Research Service, Peoria, Illinois, and given the designation NRRL 2719.

The Streptomycetes strain A–9990 forms a yellowish-greenish grey air mycelium. It has conidial chains, which are a typical feature of the family Streptomyces, and which in the case of this strain exhibit no spiral formation but are irregularly branched. The individual spores are smooth. Moreover when strain A–9990 is cultured on peptone-containing nutrient media, these media show no black brown melanoid coloration. The growth is relatively little dependent upon and also at 36° C. the fungus develops well although the optimum is at 25–32° C.

For further characterization there is described below the growth of strain A–9990 on various nutrient media. The nutrient media 1–7 and 10 were prepared according to W. Lindenbein, Arch. Mikrobiol. 17, 361 (1952).

(1) Synthetic agar: growth thin, veil-like. Air mycelium velvety, initially chalk white, later yellowish-greenish grey. Substratum uncolored.

(2) Synthetic solution: sediment, flocks milk white to greenish yellow. Pellicula initially punctiform, later wrinkled, light yellow or in part chestnut brown. Air mycelium sparse, velvety, light yellow. Substratum initially uncolored, after 2 weeks reddish brown.

(3) Glucose-agar: growth thin, veil-like, egg yellow. Air mycelium sparse, velvety, light yellow to yellowish-greenish grey. Substratum light yellow colored.

(4) Glucose-asparagin-agar: growth thin, veil-like, egg yellow to deep yellow. Air mycelium velvety, yellowish-greenish grey.

(5) Calcium malate-agar: growth thin, veil-like, light brown to brownish yellow, later deep yellow, after 14 days brownish, copper red. Air mycelium velvety, yellowish- greenish grey.

(6) Gelatine puncture (18° C.): growth good. Pellicula light yellow to reddish brown. Air mycelium velvety, white yellow to greenish grey. Substratum gold yellow to reddish brown. Liquefaction after 27 days 10–12 mm.

(7) Starch plate: growth thin, veil-like, white yellow. Air mycelium velvety, light yellow, in the ripe condition greenish grey. Hydrolysis after 10 days 1.4 cc.

(8) Potatoes: growth good, brownish to rust brown. Air mycelium velvety, yellowish-greenish grey, in part glistening light yellow red from the color of the substratum. Substratum uncolored as a rule but sometimes carmine.

(9) Carrots: growth only very sparse with white yellow air mycelium.

(10) Litmus milk: growth in the form of a pellicula with velvety, light yellow air mycelium. Substratum red. Peptonising and slow coagulation.

The strain A–9990, when tested by the Method of T. G. Pridham and D. Gottlieb, J. Bacteriology 56, 107 (1948), using various carbon sources, grows as follows:

Glucose_____ +
L-xylose_____ —
L-arabinose_____ +
L-rhamnose_____ +
D-fructose_____ +
Saccharose_____ +
Raffinose_____ +
Inulin_____ +
D-mannitol_____ +
D-sorbitol_____ —
Mesoinositol_____ (+)
Salicin_____ +

NOTE.—The above indications have the following meaning: + good growth, definite use of the carbon source concerned. (+) weak growth, use of the carbon source concerned questionable. — no growth, no use of the carbon source concerned.

The most important features of strain A–9990, namely spore outline, air mycelium color, morphology of the spore chains and chromogenity, agree with those of *Streptomyces griseus* (Krainsky) Waksman. On the other hand strain A–9990, in distinction from *Streptomyces griseus*, forms a poorly diffusing, red brown pigment. In spite of this distinction, strain A–9990 will, as a preliminary, be regarded as belonging to the species *Streptomyces griseus*.

It is known that various representatives of the species *Streptomyces griseus* produce antibiotics, e.g. streptomycin, rhodomycetin, actidion, candicidin and streptocin. It is shown below that the new antibiotic danubomycin is distinguished in a characteristic manner from these known antibiotics.

So far as the manufacture of danubomycin is concerned, the present invention is not limited to the use of strain A–9990 or other strains corresponding to the same description, but also includes the use of variants of these organisms, such as are obtained, for example, by selectionation or mutation, especially under the action of ultra-violet or X-rays or of nitrogen mustard oils.

For the production of danubomycin a strain exhibiting the properties of *Streptomyces griseus* A–9990, in an aqueous nutrient solution containing inorganic salts, a source of carbon and of nitrogen, is aerobically cultured until the medium exhibits an essential anti-bacterial and/or fungicidal effect, and then the antibiotic danubomycin is isolated from the culture filtrate and/or from the mycelium.

The nutrient solution contains as inorganic salts for example chlorides, nitrates, carbonates or sulfates of alkali metals, alkaline earth metals, magnesium, iron, zinc or manganese. Sources of carbon are especially carbohydrates, such as glucose saccharose, lactose, starch and alcohols such as glycerine and mannitol. As nitrogen containing compounds and growth promoting substances there may be mentioned for example: amino acids and mixtures thereof, peptides and proteins and also their hydrolysates, such as peptone or tryptone and meat extracts, aqueous fractions from seed and grains, such as maize and wheat, of distillation radicals in alcohol manufacture, of yeast, beans, especially of the soya plant, of seeds, for example of the cotton plant.

The culture takes place aerobically, for example in static surface culture but more preferably submerged with shaking or stirring with air or oxygen in shaking flasks or the known fermenters. A suitable temperature is between 20 and 36° C. In general the nutrient solution exhibits a substantial antibiotic effect after 1½–5 days.

For the isolation of danubomycin for example the following process can be used: The mycelium is separated from the culture filtrate, the pH remaining unaltered, at which point the majority of the antibiotic is in the culture filtrate. Nevertheless considerable quantities of the antibiotic are adsorbed on the mycelium. It is therefore advantageous to wash the latter well. For this purpose there are especially suitable organic, at least partially water soluble solvents, such as alcohols, for example methanol, ethanol and butanols, or ketones, for example acetone and methyl ethyl ketone, or organic or dilute inorganic acids, such as acetic acid, hydrochloric acid or sulfuric acid. These mycelium extracts are added to the culture filtrate either directly or after previous concentration under vacuum. The mixture is then extracted advantageously at a pH above 7, preferably between 8 and 10, with an organic solvent immiscible with water, such as esters of low fatty acids, for example ethyl acetate or amyl acetate, hydrocarbons, for example benzene, chlorinated hydrocarbons, for example ethylene chloride, methylene chloride or chloroform, ketones, for example methyl propyl ketone, methyl amyl ketone or diisobutyl ketone, alcohols, such as butyl alcohols or amyl alcohols, ethers, for example ethyl ether, diisopropyl ether, dibutyl ethers or glycol ethers and the like. When the culture broth is adjusted to pH 4 and the mycelium then separated, the whole of the antibiotically active substance is in the culture filtrate which is then extracted in the manner described above at a pH of 8–10. The mycelium extract is practically inactive. Instead of or in combination with a solvent extraction of the cultures, as a further purification operation, the antibiotic can also be recovered by adsorption, for example on active charcoal, on activated earths, such as fullers earth or floridine, or on suitable ion exchangers, such as IRC–50, and subsequent extraction of the adsorbate, for example with an organic solvent at least partly soluble in water, such as acetone, butanol of methyl ethyl ketone, if desired with addition of low molecular organic or inorganic acids.

The cultures can also be extracted by the specified method directly, without previous separation of the mycelium.

A further concentration can be achieved by repeated extraction of the organic extracts containing antibiotic with an acid aqueous solution having a pH below 5, the majority of the antibiotic activity passing over into the aqueous phase. A small amount of activity remains in the organic phase. The combined acid aqueous solutions are then extracted again in the described manner at a pH above 7 with an organic solvent immiscible with water. This proceeding can be repeated several times. As acid aqueous solutions are suitable dilute acids, such as acetic acid, hydrochloric acid or sulfuric acid or buffer solutions such as citrate or phosphate buffer.

The resulting crude bases are advantageously again taken up in an organic solvent, for example in methanol, ethanol, acetone or chloroform and separated from insoluble, antibiotically inactive substances. After removal of the solvent, the crude antibiotic danubomycin is obtained in the form of a red brown colored amorphous powder. This is of good solubility in most organic solvents, such as alcohols, ketones, esters, chlorinated hydrocarbons and aromatic hydrocarbons but practically insoluble in petroleum ether and water. On treatment with acids, yellow salts are formed of good water solubility. In alkaline media a color change to orange red to violet is observed. The antibiotic exhibits in the ultraviolet spectrum an absorption band at 243 m$\mu$ with a shoulder at 260 m$\mu$. The paper chromatographic behaviour with various solvent systems is seen from the following table, the R$f$-values having been determined by means of the antibacterial effect (*Bacterium megatherium* and *Micrococcus pyogenes*, var. *aureus*).

| Solvent system: | R$f$ |
|---|---|
| n-Butanol saturated with water | 0.65 |
| n-Butanol saturated with water+2% p-toluene sulfonic acid+2% piperidine | 0.90 |
| Methyl isobutyl ketone saturated with water | 0.00 |
| 80% ethanol with 1.5% sodium chloride, paper impregnated with 0.95-molar sodium sulfate solution and 0.05-molar sodium bisulfate solution | 0.5 |
| Butanol/methanol/water, 4:1:2 | 0.67 |
| Water saturated with methyl isobutyl ketone | 0.05 and 0.70 |
| Water saturated with methyl isobutyl ketone+1% p-toluene sulfonic acid | 0.80 |
| 75% water+25% of a mixture of 3 parts of methanol and 1 part of acetone, brought to pH 10.5 with ammonia and neutralized with phosphoric acid to pH 7.5 | 0.05 and 0.70 |

The crude antibiotic danubomycin can be separated into several components by various methods, for example chromatography on cellulose, aluminum oxide and the like, or distribution between water and an organic solvent immiscible or only partly miscible with water, if desired with addition of water soluble acids, alcohols, ketones and the like. As particularly suitable for countercurrent distribution have proved the following solvent systems, which can be used individually or in combination.

(*a*) 5 parts by volume of petroleum ether (boiling range 40–70° C.), 5 parts by volume of benzene, 8 parts by volume of methanol, 2 parts of volume of water;
(*b*) 7.5 parts by volume of petroleum ether, 2.5 parts by volume of benzene, 7.5 parts by volume of absolute ethanol and 2.5 parts by volume of water.

Advantageously the distribution takes place by the countercurrent process in corresponding apparatus. The individual components are distinguished in their physical-chemical and biological properties. They can be obtained in pure form by crystallization or reprecipitation from organic solvents such as acetone, methanol, ethyl acetate, acetone-methanol mixtures, acetone-ether mixtures, acetone-petroleum ether mixtures, ethyl acetate-ether mixtures, ethyl acetate-petroleum ether mixtures or from aqueous-organic solutions, as in dilute alcohols, dilute acetone and so on.

The crude antibiotic danubomycin can be resolved in system (*a*) over 10 stages into an active and a practically inactive component. The active component exists in stages 4–10 and can itself be resolved in system (*b*) over 375 stages into at least 4 components to be referred to as danubomycin B1, B2, B3 and B4. The maxima of the 4 components are in stages 40, 64, 124 and 164. The component B1 crystallises from ethyl acetate, the components B2 and B3 from acetone.

Antibiotic danubomycin has no similarity with the other antibiotics produced from *Streptomyces griseus*. Contrary to antibiotic danubomycin, streptomycin and grisein are of good water solubility, whereas rhodomycetin is insoluble in dilute acids. Candicidin is insoluble in most organic solvents and has a different absorption in the ultra violet spectrum. Further distinctions of antibiotic danumomycin consist in the case of streptomycin, actidion and streptocin in characteristic color and in the case of neutral actidion and acid rhodomycetin and streptocin in chemical character. In addition grisein contains iron and sulfur, which have not been detected in antibiotic danubomycin.

The salts of antibiotic danumomycin and its components B1, B2, B3 and B4 are derived from the known inorganic and organic acids, for example from hydrochloric acid, the sulfuric acids, acetic, propionic, valeric, palmitic or oleic acid, succinic acid, citric acid, mandelic acid, pantothenic acid, absorbic acid, or from amino acids, such as glutamic acid, cysteic acid, or the like. They constitute neutral or acid salts. Their preparation takes place by the action of the corresponding acids upon the free base or by reacting a salt of the antibiotics with a salt of the acid concerned for example of danubomycin sulfate with calcium pantothenate.

Antibiotic danubomycin possesses an antibiotic activity against various test organisms. By using as test method in vitro dilution series (powers of ten) in glucose bouillon, incubated for 24 hours at 37° C., the following still inhibiting concentrations are found.

Test organisms:     Inhibiting concentration, $\mu$g./cm.$^3$

| Test organism | Inhibiting concentration |
|---|---|
| Micrococcus pyogenes, var. aureus | 10 |
| Micrococcus pyogenes, var. aureus, penicillin-resistant | 10 |
| Streptococcus pyogenes | 1 |
| Streptococcus viridans | 0.1 |
| Streptococcus faecalis | 10 |
| Corynebacterium diphtheriae | 0.1 |
| Escherichia coli | 100 |
| Salmonella typhosa | 100 |
| Shigella sonnei | 100 |
| Pseudomonas aeruginosa | 100 |
| Klebsiella Type A | 100 |
| Pasteurella pestis | 100 |
| Vibrio chlorerae El Tor | 100 |
| Bacillus megatherium | 10 |
| Candida vulgaris | 10 |
| Endomyces albicans | 10 |
| Mycobacterium tuberculosis+ | 100 |
| Trichomonas foetus++ | 0.1 |

+Cultivated in Kirchner's synthetic medium with 5 parts per 1,000 of bovine albumin; growth determined after 2 weeks.
++In bouillon with 10% horse serum.

The development of influenza virus on isolated membranes of chicken-chorioallantois of 14 day hatched eggs is still inhibited by antibiotic danubomycin in a concentration of less than 10 $\mu$g. per cc.

Antibiotic danubomycin is likewise active in vivo. When adult female hamsters are subjected to intravaginal infection with *Trichomonas foetus* and the resulting chronic trichomonadic infection is treated locally for 3 weeks with an 0.3% aqueous suspension of antibiotic danubomycin, the trichomonadic infection disappears in four out of four animals.

The present invention provides, in addition to a process for the manufacture of antibiotic danubomycin, its components and the neutral and acid salts thereof, also the specified compounds themselves, especially the sulfates, the hydrochlorides, acetates and pantothenates and also the splitting products, such as are obtained, for example, by hydrolysis.

Antibiotic danubomycin, its components B1, B2, B3 and B4, their salts and derivatives, the above specified splitting products or mixtures comprising the same can be used as medicaments, for example in the form of pharmaceutical preparations. These contain the specified compounds in admixture with a pharmaceutical organic or inorganic carrier material suitable for enteral, parenteral or local administration. As such these substances are concerned that do not retact with the new compounds, for example, gelatine, lactose, starch, magnesium stearate, talc, vegetable oils, benzyl, alcohols, gums, polyalkylene glycols, petroleum jelly, cholesterol or other known medicament carriers. The pharmaceutical preparations can be, for example, in the form of tablets, dragees, powders, salves, creams, suppositories or in liquid form as solutions, suspensions or emulsions. If desired they are sterilized and/or contain auxiliary substances such as preserving, stabilizing, wetting or emulsifying agents. They can also contain other therapeutically valuable substances.

The following examples illustrate the invention:

*Example 1*

A nutrient solution is produced of the composition: 20 grams of glycerol, 10 grams of soya flour, 5 grams of sodium chloride, 1 gram of sodium nitrate, 10 grams of calcium carbonate and 1 liter of tap water and it is adjusted to pH 7.3. This solution, or a multiple thereof, is filled into 500 cc. conical flasks (each containing 100 cc. of nutrient solution) or into 500 liter fermenters (each containing 300 liters of nutrient solution) and the whole sterilized for 20–30 minutes at one atmosphere gauge pressure. Inoculation is then carried out with up to 10% of a partially sporulating, vegetative culture of Streptomycetes strain A–9990 and incubated with good shaking or stirring and in the fermenters with aeration (with about 1 volume of sterile air per volume of nutrient solution per minute) at 27° C. After 70–120 hours growth, the cultures are filtered with addition of a filter aid, according to the volume through a laboratory filter or a filter press or rotating filter and in this manner the antibiotically active aqueous solution freed from mycelium and other solid constituents.

*Example 2*

If there are used instead of the medium specified in Example 1, the nutrient solutions *a, b, c, d, e,* or *f,* described below, then after analogous sterilization, inoculation with the Streptomycetes strain A–9990, incubation at 27° C. and filtration, aqueous antibiotically active solutions are obtained.

(a) 10 grams of crude glucose, 5 grams of peptone, 3 grams of meat extract (Oxo Lab Lemco), 5 grams of sodium chloride, 10 grams of calcium carbonate and 1 liter of tap water; pH before sterilization 7.5.

(b) 20 grams of lactose, 20 grams of distillers' solubles, 1 gram of sodium nitrate, 3 grams of sodium chloride, and 1 liter of tap water; pH before sterilization 7.5.

(c) 20 grams of mannitol, 20 grams of soya flour and 1 liter of tap water; pH before sterilization 7.5.

(d) 10 grams of lactose, 10 grams of soya flour, 5 grams of sodium chloride, 10 grams of calcium carbonate, 1 gram of sodium nitrate and 1 liter of tap water; pH before sterilization 7.5.

(e) 20 grams of mannitol, 20 grams of distillers' solubles, 3 grams of sodium chloride, 1 gram of sodium nitrate and 1 liter of tap water; pH before sterilization 7.5.

(f) 10 grams of glucose, 10 grams of soya flour, 5 grams of sodium chloride, 1 gram of sodium nitrate, 10 grams of calcium carbonate and 1 liter of tap water; pH before sterilization 7.5.

*Example 3*

The filter residue from a 150 liter batch obtained according to Examples 1 or 2 is well stirred with 25 liters of acetone and again filtered. This is repeated twice, whereupon the acetone solutions containing the antibiotic are combined, concentrated under vacuum to 5 liters and combined with the culture filtrate. The resulting solution is now extracted at pH 8.5 with 70 liters of ethyl acetate in a Westphalia extractor, whereby the total antibiotic activity passes into the organic phase. The orange red extract is washed with water, evaporated under vacuum to 5 liters and then extracted by shaking several times with 0.5 N-acetic acid. The ethyl acetate solution exhibits a slight antibiotic activity, while the majority of the activity is found in the acetic acid solutons. These solutions are combined, brought with 2 N-sodium carbonate solution to pH 8.5, whereby the color changes from yellow to orange red, and extracted with ethylene chloride. The ethylene chloride extract is again extracted with 0.5 N-acetic acid, whereupon the latter is rendered alkaline, as above described, and extracted. Finally the ethylene chloride solution is dried over sodium sulfate and evaporated under vacuum. The antibiotically active crude bases are thus obtained as brown red colored products in the form of an amorphous powder. This is of good solubility in methanol, ethanol, acetone, ethyl acetate, chloroform, ethylene chloride, benzene and dilute aqueous acids. It is scarcely soluble in water and petroleum ether. Its ultraviolet spectrum shows a maximum at 243 m$\mu$ with a shoulder at 260 m$\mu$.

Its behaviour in the paper chromatogram in various solvent systems is as follows.

| Solvent system: | $R_f$ |
|---|---|
| n-Butanol saturated with water | 0.65 |
| n-Butanol saturated with water+2% of p-toluene sulfonic acid+2% of piperidine | 0.90 |
| Methyl isobutyl ketone saturated with water | 0.00 |
| 80% ethanol with 1.5% sodium chloride, paper impregnated with 0.95-molar sodium sulfate solution and 0.05-molar sodium bisulfate solution | 0.5 |
| Butanol/methanol/water, 4:1:2 | 0.67 |
| Water saturated with methyl isobutyl ketone | 0.05 and 0.70 |
| Water saturated with methyl isobutyl ketone+1% of p-toluene sulfonic acid | 0.80 |
| 75% water+25% of a mixture of 3 parts of methanol and 1 part of acetone, brought with ammonia to pH 10.5 and neutralized with phosphoric acid to pH 7.5 | 0.05 and 0.70 |

*Example 4*

32 grams of the crude bases obtained according to Examples 1 and 3 are subjected to a ten-stage countercurrent distribution, using the following solvent mixture: 5 parts by volume of petroleum ether (B.P. 40-70° C), 3 parts by volume of benzene, 8 parts by volume of methanol and 2 parts by volume of water. After the evaporation of the contents of the individual distribution vessels under vacuum at 30° there are found in stages 4-10 an activity and a substance maximum, while the majority of the inactive accompanying substances are found in stages 0-3. After combination of the products of stages 4-10, 8.5 grams are obtained of the concentrated antibiotic danubomycin in the form of an orange red powder.

Ultraviolet absorption: maximum at 243 m$\mu$ with a shoulder at 260 m$\mu$.

*Example 5*

8.5 grams of the partially purified product obtained according to Example 4 are subjected to a 375-stage countercurrent distribution using the following solvent mixture: 7.5 parts by volume of petroleum ether, 2.5 parts by volume of benzene, 7.5 parts by volume of absolute ethanol and 2.5 parts by volume of water. The contents of the individual distribution vessels are evaporated under vacuum at 30° C. Activity and substance maxims are found in the stages 35-45 (component B1), 67-70 (B2), 115-135 (B3) and 155-175 (B4). The solutions from the vessels indicated are combined and evaporated under vacuum at 30° C. to dryness.

In this manner the components B1, B2, B3 and B4 of the antibiotic danubomycin are obtained as red to orange red powders which on treatment with ethyl acetate or acetone can be caused to crystallise.

*Example 6*

A culture solution of a 950 liter batch obtained as described in Example 1 or 2 is freed from mycelium with the addition of Hyflo (an infusorial earth) as filter aid, and the filtrate and the filter residue are worked up separately.

(a) The culture filtrate is cooled, its pH adjusted to 8.5-9 with sodium hydroxide solution and extracted in a ratio of 3:1 with ethyl acetate in an extractor, the whole antibiotic activity passing into the organic phase. The extract is adsorbed directly on a column charged with 1 liter Amberlite JRC-50 (acid form dehydrated with methanol, and the methanol replaced by ethyl acetate). The fraction is antibiotically inactive. Further inactive accompanying substances can be washed out with methanol. The antibiotic danubomycin is then eluted with 0.4 N-methanolic hydrochloric acid. About half of the active eluates has a pH value between 4 and 6, whilst the other half has a pH of about 1.5. The latter is deacidified on a column of Amberlite IR-45. The combined methanolic eluates are then adjusted to pH 35 with methanolic hydrochloric acid and concentrated to a small volume (200-300 cc.) in a rotatory evaporator at a maximum temperature of 30° C. and stirred into ten times the volume of ethyl acetate. The precipitate is suction-filtered, washed with ethyl acetate and ether and dried at 20-25° C. under reduced pressure. Yield: 5 grams of yellow brown antibiotic danubomycin in the form of the hydrochloride.

(b) The moist filter residue consisting of mycelium and Hyflo (about 170 kg.) is stirred twice with 170 liters of acetone. The antibiotic active substances are adsorbed on a column of Amberlite IRC-50 (acid form, pretreated with 70% acetone). The hydrochloride of antibiotic danubomycin obtained as described under (a) contains rather a large amount of impurities in the form of inorganic salts. Yield: 29.4 grams of yellow powder.

*Example 7*

6700 liters of a culture solution of a batch obtained as described in Example 1 or 2 is adjusted to pH 4 with hydrochloric acid. When the pH does not change for half an hour, 2% Hyflo is added and the whole filtered. The culture filtrate is extracted at pH 8.5-9.0 in an extractor with ethyl acetate in a ratio of 3:1. The antibiotic active substances are adsorbed on 4 liters of Amberlite IRC-50 as described in Example 6 and eluted. The yield is 85 grams of yellow brown hydrochloride of the antibiotic danubomycin. No more active material can be obtained from the filter cake by extraction with acetone.

What is claimed is:

1. Process for the manufacture of the new antibiotic danubomycin, wherein *Streptomyces griseus*, strain NRRL 2719, in a nutrient solution containing a source of carbon and nitrogen and inorganic salts is cultured under aerobic conditions until the nutrient solution shows an essential antibiotic action, whereupon the new antibiotic danubomycin is isolated.

2. Process as claimed in claim 1, wherein the strain NRRL 2719 is cultured under submerged conditions.

3. Process as claimed in claim 1, wherein the nutrient solution contains growth-promoting substances.

4. Process as claimed in claim 1, wherein the culturing is carried out for 36 to 120 hours at a temperature between 20 and 40° C.

5. Process as claimed in claim 1, wherein the antibiotic danubomycin is extracted from the culture filtrate at a pH above 7 with an organic solvent immiscible with water.

6. Process as claimed in claim 1, wherein the antibiotic danubomycin is extracted from the separated mycelium with an organic solvent which is at least partially miscible with water.

7. Process as claimed in claim 1, wherein the antibiotic danubomycin is extracted from the mycelium with an acid.

8. Process as claimed in claim 1, wherein the antibiotic danubomycin is purified by adsorption and extraction from the adsorbate with an organic solvent at least partially soluble in water.

9. Process as claimed in claim 1, wherein the antibiotic danubomycin is purified by distribution between an aqueous solution and an organic solvent immiscible with water and separated into its components B1, B2, B3 and B4.

10. Process as claimed in claim 1, wherein the distribution is carried out by the countercurrent process.

11. Process as claimed in claim 1, wherein the components B1, B2, B3 and B4 are obtained in crystalline form from an organic solvent.

12. Process as claimed in claim 1, wherein the antibiotic danubomycin and its components B1, B2, B3 and B4 respectively are prepared in the form of their salts with an acid by the action of this acid on the free bases of the antibiotics.

13. A member selected from the group consisting of the antibiotic danubomycin, a reddish substance having basic properties, being soluble in alcohols, ketones, esters, chlorinated hydrocarbons and aromatic hydrocarbons and practically insoluble in petrolether and water, forming with acids yellow salts of good-water-solubility, exhibiting in the U.V.-spectrum a band at 243 m$\mu$ with shoulder at 260 m$\mu$, and showing in paper-chromatography the following R$f$-values:

| | |
|---|---|
| In n-butanol saturated with water | 0.65 |
| In n-butanol saturated with water+2% p-toluene sulfonic acid+2% piperidine | 0.90 |
| In methyl isobutyl ketone saturated with water | 0.00 |
| In 80% ethanol with 1.5% sodium chloride, paper impregnated with 0.95-molar sodium sulfate solution and 0.05-molar sodium bisulfate solution | 0.5 |
| In butanol/methanol/water, 4:1:2 | 0.67 |
| In water saturated with methyl isobutyl ketone | 0.05 and 0.70 |
| In water saturated with methyl isobutyl ketone +1% p-toluene sulfonic acid | 0.08 |
| In 75% water+25% of a mixture of 3 parts of methanol and 1 part of acetone, brought to pH 10.5 with ammonia and neutralized with phosphoric acid to pH 7.5 | 0.05 and 0.70 | and acid addition salts thereof, said danubomycin having been produced by the process of claim 1.

14. A member selected from the group consisting of component B1 of the antibiotic danubomycin as described in claim 13 as found in stages 35–45 when the latter is subjected to counter-current distribution over 375 stages in the solvent mixture petroleum ether/benzene/ethanol/water (7.5:2.5:7.5:2.5) and crystallizable from ethyl acetate, and acid addition salts thereof.

15. A member selected from the group consisting of component B2 of the antibiotic danubomycin as described in claim 13 as found in stages 60–70 when the latter is subjected to counter-current distribution over 375 stages in the solvent mixture petroleum ether/benzene/ethanol/water (7.5:2.5:7.5:2.5), and crystallizable from acetone, and acid addition salts thereof.

16. A member selected from the group consisting of component B3 of the antibiotic danubomycin as described in claim 13 as found in stages 115–135, when the latter is subjected to counter-current distribution over 375 stages in the solvent mixture petroleum ether/benzene/ethanol/water (7.5:2.5:7.5:2.5), and crystallizable from acetone, and acid addition salts thereof.

17. A member selected from the group consisting of component B4 of the antibiotic danubomycin as described in claim 13 as found in stages 155–175 when the latter is subjected to counter-current distribution over 375 stages in the solvent mixture petroleum ether/benzene/ethanol/water (7.5:2.5:7.5:2.5), and acid addition salts thereof.

References Cited in the file of this patent

Yamaguchi et al.: Gen. Appl. Microbiology, pp. 201–234, pub. 1955.

Arai: J. Antibiotics Ser. A 1960, No. 1, pages 46–56.